United States Patent [19]
Suzuki et al.

[11] 3,993,295
[45] Nov. 23, 1976

[54] ENERGY STORING DEVICE

[75] Inventors: Masuo Suzuki; Suehiro Takatsu, both of Nagoya, Japan

[73] Assignee: Kabushiki Kaisha Takatsu Seisakusho, Japan

[22] Filed: Sept. 24, 1975

[21] Appl. No.: 616,450

[30] Foreign Application Priority Data

May 21, 1975 Japan............................ 50-060531

[52] U.S. Cl................................ 267/152; 267/153; 363/63 R; 188/268
[51] Int. Cl.²............................................ F16F 3/08
[58] Field of Search........... 267/152, 153, 140, 141, 267/145, 133, 182, 63 A, 35; 188/268; 280/671, 687, 716; 105/197 A; 293/87, 88

[56] References Cited
UNITED STATES PATENTS

| | | | |
|---|---|---|---|
| 2,724,588 | 11/1955 | Sheets | 267/35 |
| 3,323,786 | 6/1967 | Boschi | 267/153 |
| 3,493,221 | 2/1970 | Mozdzanowski | 267/153 |
| 3,584,858 | 6/1971 | Beck | 267/153 |
| 3,608,883 | 9/1971 | Russold | 267/152 |
| 3,901,495 | 8/1975 | Suzuki | 267/153 |

*Primary Examiner*—James B. Marbert
*Attorney, Agent, or Firm*—Connolly and Hutz

[57] ABSTRACT

Energy storage device characterized in that energy storing body formed of hollow cone of polyurethane is provided between pair of guide members in form of inverted hollow cones. These assemblies are serially arranged one upon another and held in cylinder body under piston pressure. Compressive force developed between pair of guide members deforms energy storing cone and restoring force of body is taken out as hydraulic power.

8 Claims, 15 Drawing Figures

ENERGY STORING DEVICE

BACKGROUND OF THE INVENTION

The present invention relates to an energy storing device and more particularly to an energy storing device which utilizes the restoring characteristics of polyurethane resin.

A device for controlling a machine by slowly releasing stored energy finds use in various fields of engineering. The only construction which has been so far available for the purpose of slowly releasing stored energy is the steel spring. However, such devices can only store a limited amount of energy and use thereof has been restricted because of the configuration.

SUMMARY OF THE INVENTION

An object of the present invention is to provide a device which utilizes the restoring characteristics of polyurethane resin to develop energy.

Another object of the present invention is to provide a device which utilizes the restoring characteristics of a hollow cone of polyurethane resin which has been axially compressed and deformed.

Still another object of the present invention is to provide a device in which an energy storing body is provided between a pair of guide members of inverted hollow cone shape whereby energy is stored by compressing and deforming the energy storing body following the contours of the inverted hollow cones which form the guide members.

Still another object of the present invention is to provide a device in which combinations of energy storing bodies and inverted hollow cone-shaped guide members are built into a cylinder and the stored energy in the cylinder is taken out as hydraulic pressure.

Still another object of the present invention is to provide a device which widely serves as an energy source for various machines.

BRIEF DESCRIPTION OF THE DRAWINGS

Novel features and advantages of the present invention in addition to those mentioned above will become apparent to those skilled in the art from a reading of the following detailed description in conjunction with the accompanying drawings wherein similar reference characters refer to similar parts and in which:

FIG. 8b is a plan view of the guide member of FIG. 8a;

FIG. 12b is a bottom plan view of the energy storing body of FIG. 12a.

DETAILED DESCRIPTION OF THE INVENTION

Figure 1:
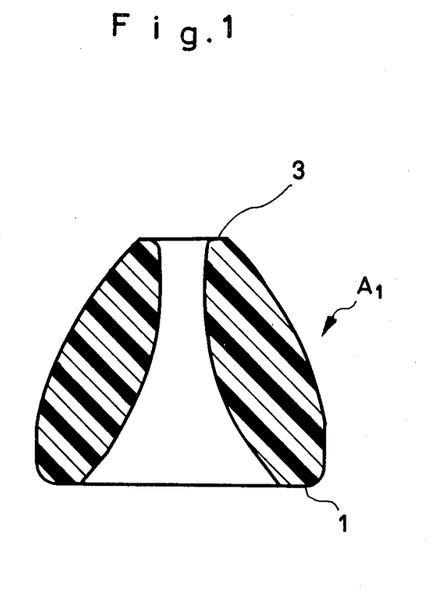
FIG. 1 is a longitudinal sectional view of an energy storing body used in a device according to the present invention.

FIGS. 1-6 illustrate one embodiment of the present invention utilizing an energy storing body $A_1$. As shown in FIG. 1, the energy storing body $A_1$ represents a hollow cone of polyurethane resin with its inner and outer surfaces smoothly curved in a generally vertical direction. The middle portion of the body is thick and that thickness diminishes toward the top and bottom of the body.

Figure 2:
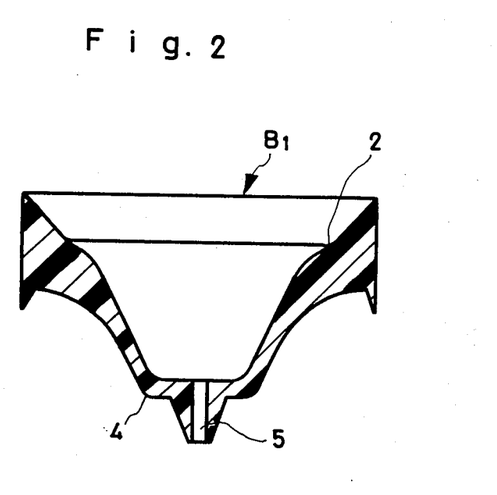
FIG. 2 is a longitudinal sectional view of a guide member used in a device according to the present invention.

FIG. 2 illustrates a guide member $B_1$ adapted to be coupled with the energy storing body $A_1$ and functions as holding means therefor. The guide member $B_1$ has a seat 2 at its top open edge for receiving the large diameter periphery 1 of the energy storing body $A_1$. Also, the guide member $B_1$ has a seat 4 at its bottom for receiving the small diameter periphery 3 of the energy storing body $A_1$. An air hole 5 is located at the center of the bottom end of the member $B_1$, and the inner and outer surfaces are smoothly curved thereby forming an inverted hollow cone.

Figure 3:
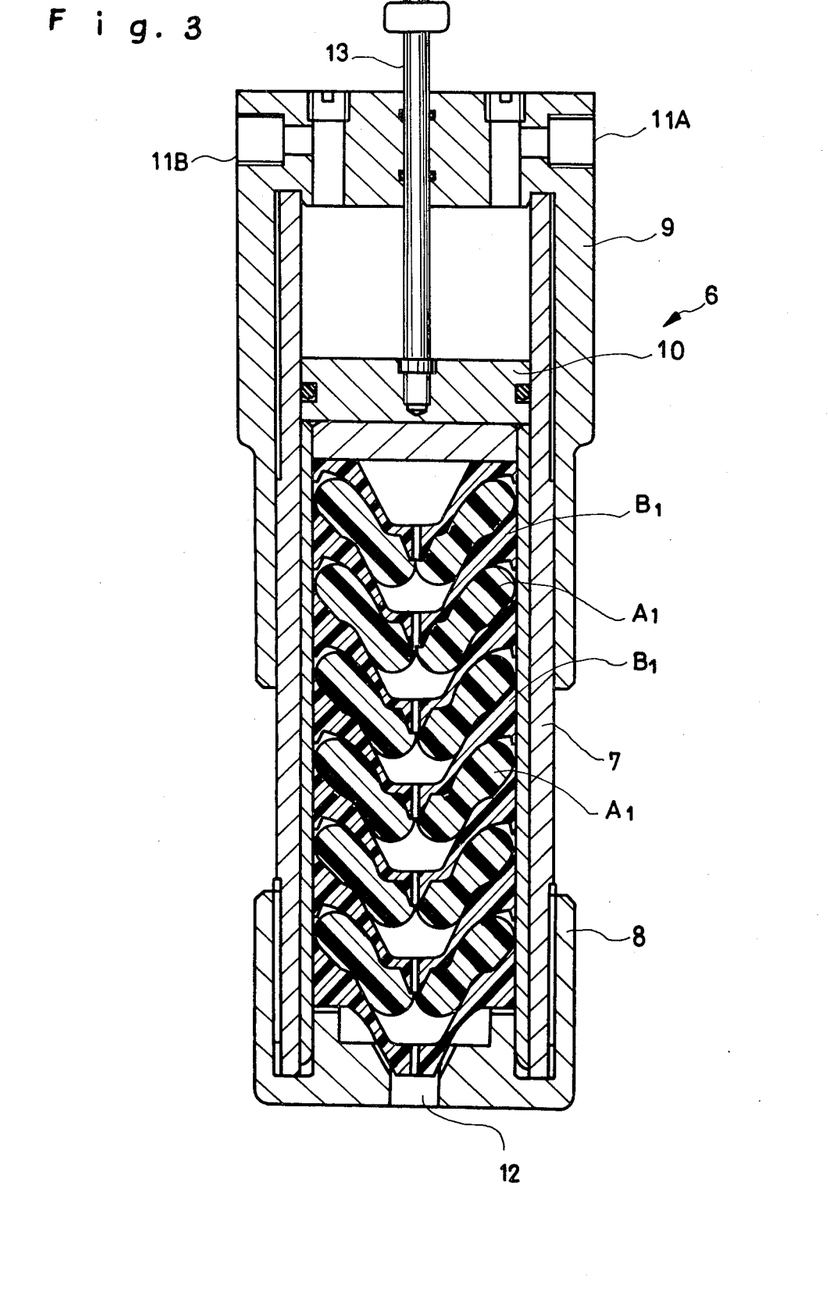
FIG. 3 is a longitudinal sectional view of one embodiment of the present invention.

A cylinder device 6 is provided for holding an assembly of the energy storing bodies $A_1$ and guide members $B_1$. As shown in FIG. 3, the cylinder 6 consists of a base plate 8 and a cover plate 9 to seal both ends of a cylinder body 7. A piston 10 is inserted in the cylinder body 7, and the cylinder body 7 is divided by the piston 10 into two chambers, one of which communicates with a pressurized oil supply and exhaust holes 11A, 11B opening in the cover plate 9. An air exhaust hole 12 is centrally located in the base plate 8.

Figure 4:
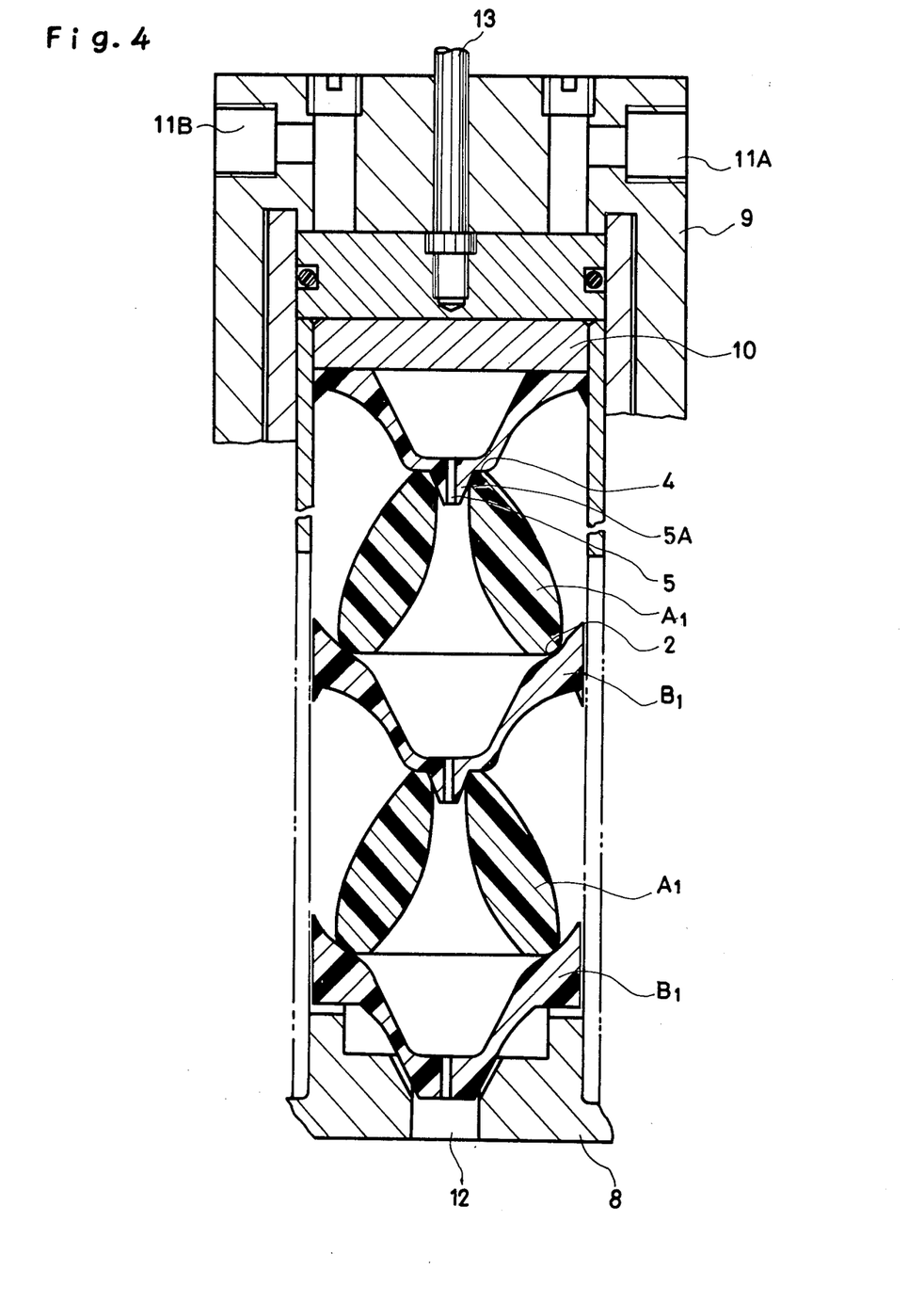
FIGS. 4-6 schematically illustrate the deformation of the energy storing body shown in FIG. 1.

In FIG. 4, the guide member $B_1$ is inserted into the cylinder body 7 through the bottom end thereof. The projection 5A provided with the air hole 5 is placed facing the air exhaust hole 12. The energy storing body $A_1$ is positioned within the cylindrical body 7 so that the large diameter periphery 1 of the energy storing body $A_1$ rests upon the seat 2 of the guide member $B_1$. The guide member $B_1$ next to the energy storing body $A_1$ is located so that the projection 5A provided with the air hole 5 fits within the small diameter periphery 3 of the energy storing body $A_1$.

Similarly a guide member $B_1$ and an energy-storing body $A_1$ are assembled one next to the other, and the overall assembly is inserted into one of the chambers in the cylinder body 7. A guide member $B_1$ is placed at the top most level and its top surface is in contact with the piston 10. Thus each energy storing body $A_1$ is held between a pair of top and bottom guide members $B_1$, $B_1$. As shown in FIG. 4, a piston shaft 13 penetrates the cover plate 9 and extends out of the cylinder device 6.

Figure 5:
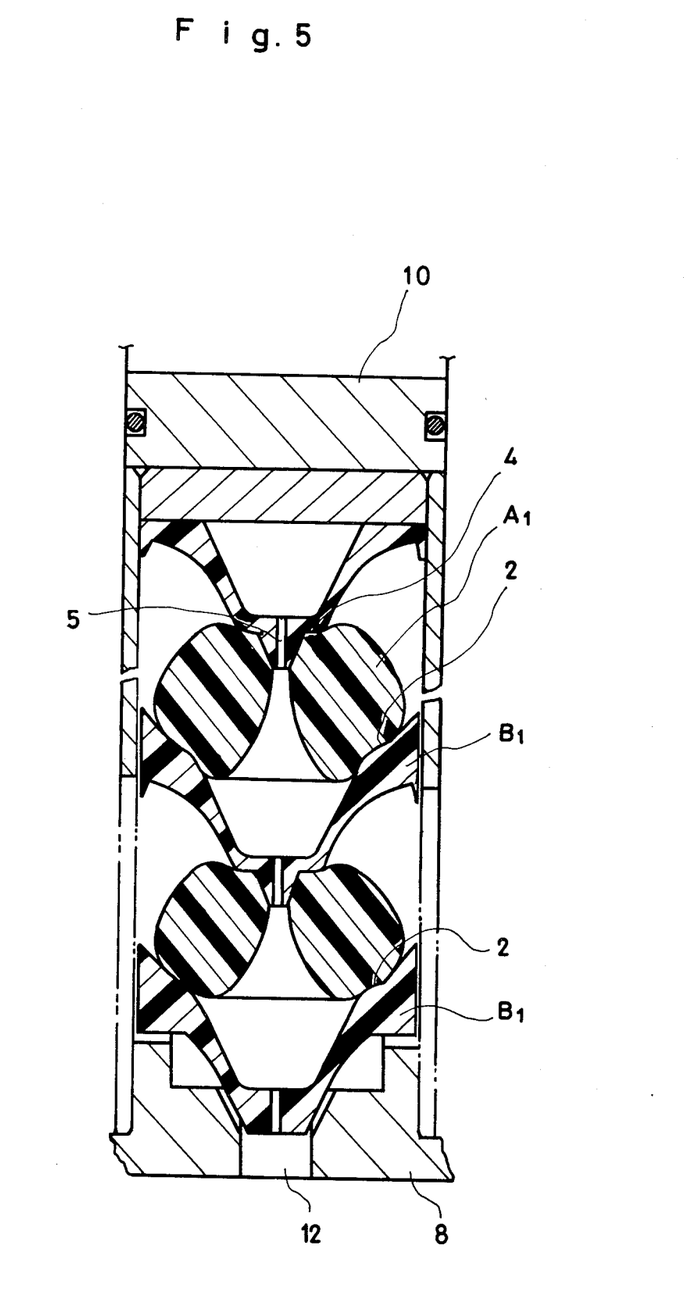
Figure 6:
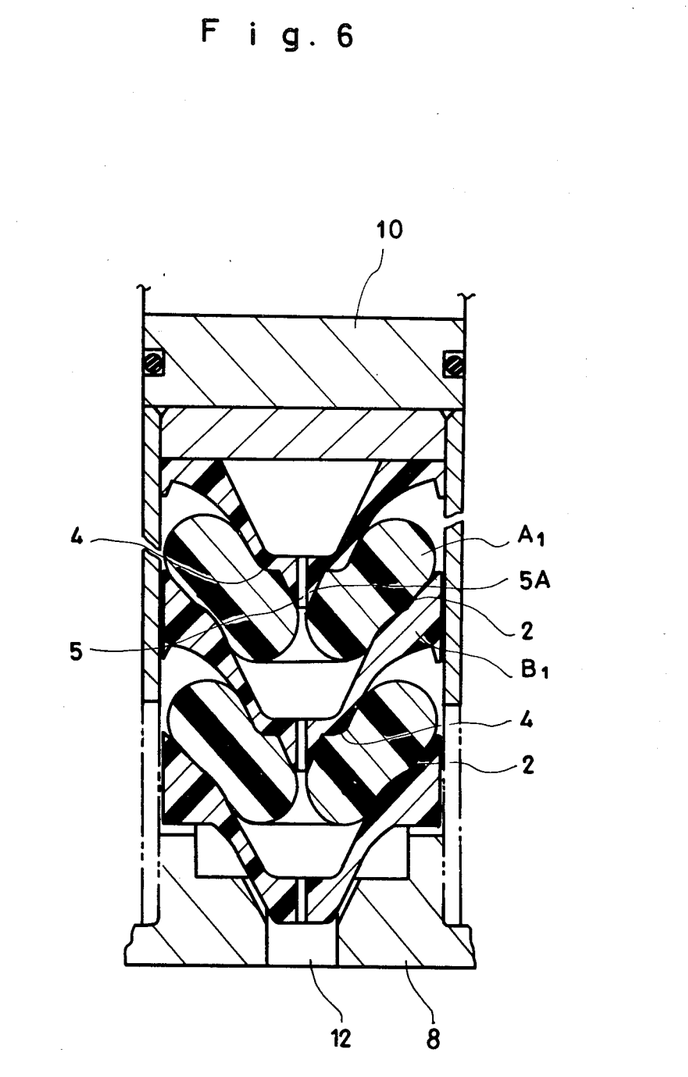
Figure 7:
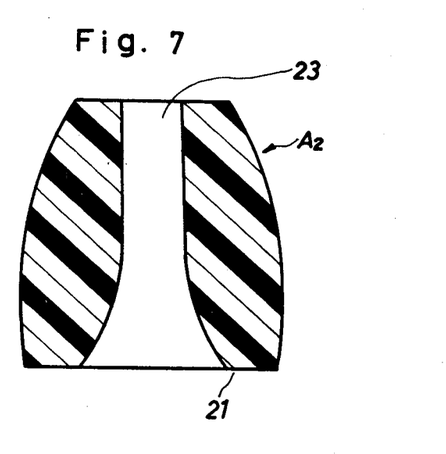
FIG. 7 is a longitudinal sectional view of another energy storing body.
Figure 8A:
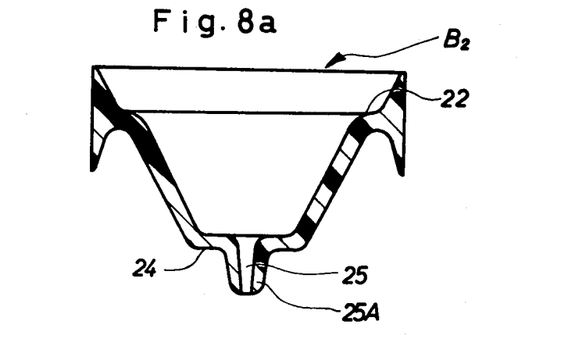
FIG. 8a is a longitudinal sectional view of another guide member.
Figure 8B:
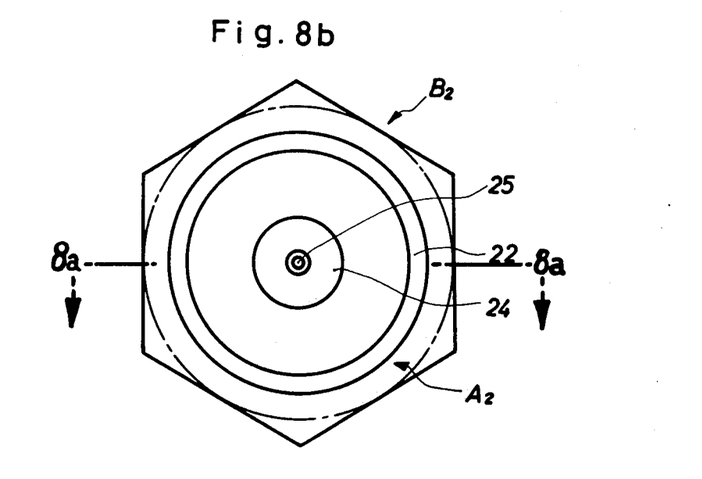

In the embodiment illustrated in FIGS. 1-6, when pressurized oil is sent through the supply hole 11A into the cylinder body 7 to push the piston 10, each energy storing body $A_1$ provided between the guide members $B_1$, $B_1$ is deformed as a result of receiving a pressure from the seat 4 of the upper guide member $B_1$ in the state of being supported on the seat 2 of the lower guide member $B_1$. The deformation is such that the top and bottom edges of the body $A_1$ are compressed along the seats 2, 4 of the upper and lower guide members $B_1$, $B_1$, as indicated in FIG. 5. Then under an increased pressure, as indicated in FIG. 6, the projection 5A of the guide member $B_1$ sinks deep into the lower energy storing body $A_1$. In consequence, with the bulge of the energy storing body $A_1$ compressed between the guide members $B_1$, $B_1$, the body $A_1$ is deformed and its cone shape is inverted.

FIG. 3 illustrates the state of each energy storing body $A_1$ after its final change, where each energy storing body $A_1$, squeezed between the upper and lower guide members $B_1$, $B_1$, has turned into an inverted cone. Through this deformation of the energy storing body $A_1$, the energy applied from outside is stored within the body $A_1$. The hollow cone of polyurethane resin, which constitutes the energy storing body $A_1$, restores itself and is displaced in the axial direction when the external pressure is removed. Such displacement is conveyed to the piston 10, and the displacement of the piston may be taken out in the form of pressurized oil leaving the exhaust hole 11B. The restoration of the energy storing body $A_1$ takes place just as a reversal of the deformation. Finally each energy storing body $A_1$ is restored to the configuration illustrated in FIG. 4 thereby releasing the energy internally stored.

In the second embodiment of the present invention illustrated in FIGS. 7–10, the energy storing body is held between guide members of inverted cone shape. A large number of such assemblies are arranged adjacent one another in several upper and lower rows and they are forced into a cylinder under the pressure of a piston. The energy storing body used here is of the same structure as the one indicated in the first embodiment, but the guide member $B_2$ to be coupled with the energy storing body $A_2$ is polygonal in plan view, such as hexagonal as shown in FIG. 8b. The top open edge of the guide member $B_2$ defines a seat 22 for receiving the large diameter periphery 21 of the energy storing body $A_2$. A seat 24 is provided on the lower end of the member $B_2$ for receiving the small diameter periphery 23 of the energy storing body $A_2$. The center of the bottom end of the member $B_2$ carries a projection 25A with an air hole 25.

Figure 9:
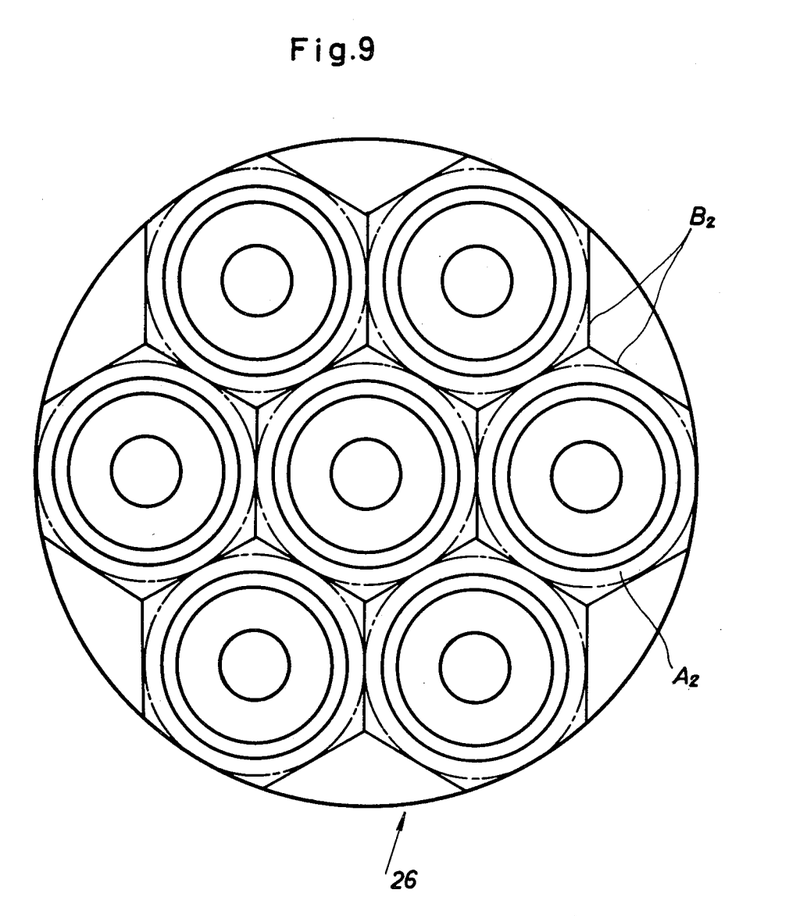
FIG. 9 is a plan view illustrating the arrangement of guide members built into a cylinder.
Figure 10:
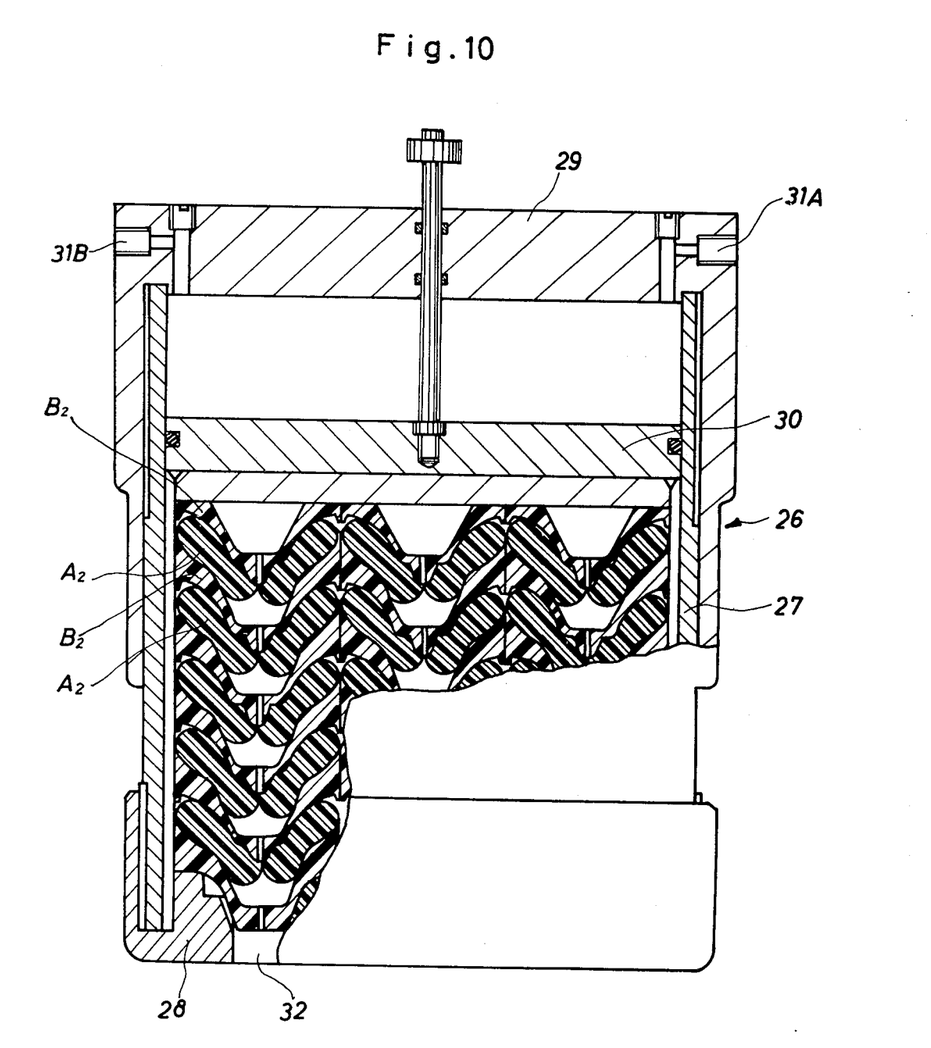
FIG. 10 is a partial longitudinal sectional view of another embodiment of the present invention.

The guide members $B_2$ and the energy storing bodies $A_2$ are arranged one over the other and adjacent to another similar set, with each side of the hexagon of the guide member $B_2$ facing the corresponding side of another set. The overall arrangement is held within a cylinder device 26 comprising a base plate 28 and a cover plate 29 sealing both ends of a cylinder body 27. A piston 30 is inserted within cylinder body 27.

The cylinder 27 is divided by the piston 30 into two chambers, one of which communicates with the supply and exhaust holes 31A, 31B of the pressurized oil opening in the cover plate 29. And in the same manner as the first embodiment, a large number of air exhaust holes 32, 32 . . . are located in the base plate 28. The air exhaust holes 32 are in alignment with the air holes 25 of the bottom most guide members $B_2$, as shown in FIG. 10.

In the embodiment of the invention illustrated in FIGS. 7–10, the energy is stored when an oil is forced through the supply hole 31A into the cylinder 27 to push the piston 30 in a downward direction. In consequence, the energy storing body $A_2$ in each row in the parallel arrangement of guide members $B_2$ and energy storing bodies $A_2$ is deformed receiving a pressure from the seat 24 of the upper guide member $B_2$ in the state of being supported on the seat 22 of the lower guide member $B_2$. Restoration of the energy storing body takes place just as a reversal of the above-mentioned deformation, and the internally stored energy is released when the original configuration is finally restored. This energy is taken out as a displacement of the piston 30, i.e. as a pressurized oil coming out of the exhaust hole 31B.

Figure 11A:
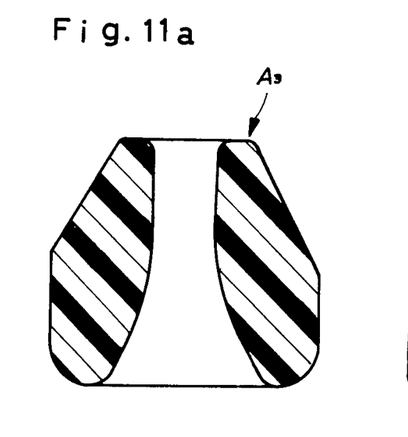
FIG. 11a is a longitudinal sectional view of still another energy storing body according to the present invention.
Figure 11B:
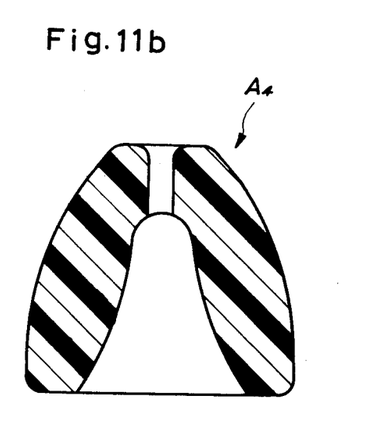
FIG. 11b is a longitudinal sectional view of another energy storing body according to the present invention.
Figure 12A:
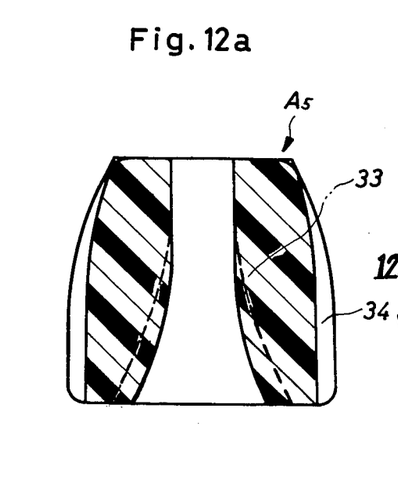
FIG. 12a is a longitudinal sectional view of another modification of the energy storing body.
Figure 12B:
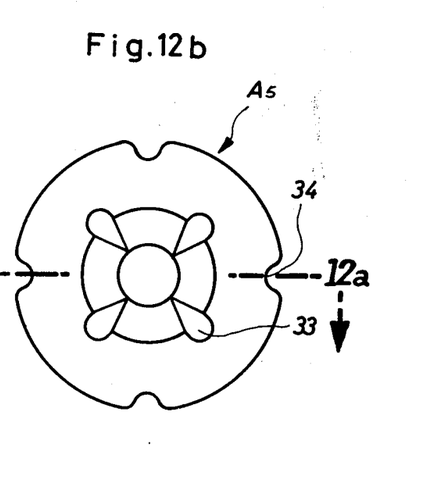

In both the first and the second embodiments the shape of the energy storing body is not confined to the one illustrated above. The shape can be any one of the various modifications indicated as $A_3$, $A_4$, $A_5$ in FIGS. 11 and 12. The shape of the body of FIG. 11a has a straight portion on the periphery while the body shown in FIG. 11b is slightly modified in the internal profile and the diameter. The energy storing body of FIGS. 12a and b has internal grooves 33 and external grooves 34.

As described above, according to the present invention sets of energy storing bodies, i.e., hollow cones of polyurethane resin as squeezed between guide members of inverted cone shape are piled up and the energy is internally stored when the energy storing bodies are deformed following the contours of the guide members. The feature of polyurethane resin is effectively utilized to internally store powerful energy. It is on account of the energy storing bodies molded particularly into cones being not flatly collapsed but deformed into inverted cones that powerful energy can be internally stored.

Especially through qualitative selection of polyurethane resin, a compact, lightweight energy storing device never attainable in the conventional steel spring can be accomplished and it can be applied as the energy source for various machines.

What is claimed is:

1. An energy storing device comprising energy storing bodies formed of hollow cones of polyurethane resin, means for holding the energy storing bodies one above the other, means for compressing and deforming the energy storing bodies whereby the hollow cones are turned inside out, and means for extracting the energy of the deformed energy storing bodies whereby the energy is internally stored through deformation of the energy storing bodies and the stored energy is released through restoration of the deformed bodies and wherein the holding means for each energy storing body is in the shape of an inverted hollow cone having at its top open edge a seat for receiving the large diameter periphery of the energy storing body and having at its bottom end a seat for receiving the small diameter periphery of the energy storing body, each holding means also having an air opening in the bottom end thereof.

2. An energy storing device as in claim 1 wherein each energy storing body is a hollow cone with smoothly curved surfaces in the vertical direction, thickened in the middle portion thereof and reduced in thickness toward the upper and lower ends thereof.

3. An energy storing device as in claim 1 wherein each energy storing body has at least one straight portion on its outer surface.

4. An energy storing device as in claim 1 wherein each energy storing body has longitudinal grooves on the inner and outer surfaces thereof.

5. An energy storing device as in claim 1 wherein the energy storing bodies and the holding means for the energy storing bodies are serially alternated one above the other, and a cylinder body surrounding the bodies and the holding means.

6. An energy storing device as in claim 5 including a piston cooperating with the cylinder body and fluid acting upon the piston to compress and deform the energy storing bodies.

7. An energy storing device as in claim 5 wherein serial alternations of the energy storing bodies and holding means are arranged parallel within the cylinder body.

8. An energy storing device as in claim 7 wherein the holding means are externally polygonal in plan view.

* * * * *